United States Patent
Melaragni

(10) Patent No.: US 7,349,630 B2
(45) Date of Patent: Mar. 25, 2008

(54) HYBRID WDM/TDM NETWORK ARCHITECTURE

(75) Inventor: William Melaragni, Billerica, MA (US)

(73) Assignee: Nortel Networks Limited (CA)

( * ) Notice: Subject to any disclaimer, the term of this patent is extended or adjusted under 35 U.S.C. 154(b) by 1090 days.

(21) Appl. No.: 09/861,822

(22) Filed: May 21, 2001

(65) Prior Publication Data

US 2002/0171888 A1 Nov. 21, 2002

(51) Int. Cl.
*H04J 14/00* (2006.01)
*H04J 4/00* (2006.01)
*H04J 14/08* (2006.01)

(52) U.S. Cl. .............................. 398/75; 398/71; 398/98

(58) Field of Classification Search ................. 398/66, 398/67, 69, 71, 72, 58, 45, 49, 50, 54, 56, 398/75, 98, 99
See application file for complete search history.

(56) References Cited

U.S. PATENT DOCUMENTS

| | | | | |
|---|---|---|---|---|
| 5,202,780 A | * | 4/1993 | Fussanger | 398/72 |
| 5,387,927 A | * | 2/1995 | Look et al. | 725/114 |
| 5,469,283 A | * | 11/1995 | Vinel et al. | 398/71 |
| 5,550,666 A | * | 8/1996 | Zirngibl | 398/72 |
| 5,815,295 A | * | 9/1998 | Darcie et al. | 398/72 |
| 6,552,832 B1 | * | 4/2003 | Beierle et al. | 398/74 |
| 2001/0030785 A1 | * | 10/2001 | Pangrac et al. | 359/125 |

\* cited by examiner

*Primary Examiner*—M. R. Sedighian
(74) *Attorney, Agent, or Firm*—McGuinness & Manaras LLP

(57) ABSTRACT

A method and apparatus for configuring a server/client network architecture. A server network device impresses an optical signal onto an optical link at a specified wavelength, where distinct wavelengths are associated with one or more of a plurality of client devices. Thus, the server addresses a specified client device, thereby polling the specified device for a response. An optical demultiplexer/combiner directs the server optical signal to the specified recipient client device on the basis of the wavelength of the server optical signal, and combines all responses on the client devices for transmission back to the server. Any transmission by the specified client device in response to polling by the server is thus received by the server.

4 Claims, 2 Drawing Sheets

HYBRID WDM/TDM NETWORK ARCHITECTURE

FIELD OF THE INVENTION

The present invention relates generally to optical data networks and, more particularly, to an architecture for a network structured under a server/client topology.

BACKGROUND OF THE INVENTION

Interconnection, typically within an enterprise network, of a single network device, such as a server, to other computers or peripherals, may be implemented using a server/client topology in which the server is connected optically to an electronic fan-out/fan-in switch that is connected, in turn, to a plurality of clients. Such a topology is depicted in FIG. 1, wherein optical link 8 connects server 10 to multiple clients $12_1$, $12_2$, $12_3$, ... $12_N$ via electronic switch 14 and electronic fan-out connections $16_1$, $16_2$, $16_3$, ... $16_N$. Electronic switch 14, also referred to herein as a 'director,' is often a bulky and expensive component. In particular, a many-to-many electronic switch is usually employed in connecting a server to multiple clients. Under the Fiber Channel (FC) standard, as currently implemented, switch 14 is typically a Layer 2 (Data Link) FC switch. Consequently, it is desirable to structure a Fiber Channel client/server network wherein the electronic switch is not required.

SUMMARY OF THE INVENTION

In accordance with preferred embodiments of the present invention, there is provided a method for connecting a first network device to a plurality of client devices in a server/client configuration. The method has the steps of:
  a. associating at feast one wavelength with each of the plurality of client devices;
  b. tuning a tunable light source to generate an optical carrier signal at a specified wavelength associated with at least a specified client device;
  c. modulating the optical carrier signal for transmitting data intended for the specified client device;
  d. polling the specified client device for a response; and
  e. receiving any response transmitted by the specified client device in response to the step of polling.

In accordance with alternate embodiments of the invention, the step of associating at least one wavelength with each of the plurality of client devices may include directing optical transmission to the specified client device according to wavelength. The step of associating at least one wavelength with each of the plurality of client devices may include providing a demultiplexer for separating optical transmission according to wavelength, and the step of receiving any response transmitted by the specified client device may include combining at least a portion of the output of the plurality of client devices for optical transmission to the first network device. Optical transmission at a specified wavelength may be provided by tuning a laser.

In accordance with other aspects of the present invention, a computer program product is provided for use on a computer system for directing data flow between a first network device and one of a plurality of client network devices. The computer program product has a computer usable medium with computer readable program code. The computer readable program code includes:

program code for impressing modulation upon an optical carrier to represent information for transmission to a specified client device;
program code for tuning a tunable light source for polling the specified client network device determined on the basis of a specified wavelength of the tunable light source; and
program code for receiving data from the specified client network device in response to polling by the first network device.

In accordance with yet a further aspect of the present invention, an optical server/client network is provided having a first network device, a tunable light source capable of modulation by the first network device, and an optical link coupled to the tunable light source for receiving a server optical signal transmitted by the tunable light source. The network also has a demultiplexer/combiner coupled to the optical link for directing distinct wavelength components of the server optical signal to at least one of a plurality of client network devices and for directing any client optical signal through the optical link to the first network device.

BRIEF DESCRIPTION OF THE DRAWINGS

The accompanying description of various embodiments of the invention should be appreciated more fully with reference to the accompanying drawings wherein.

DETAILED DESCRIPTION OF SPECIFIC EMBODIMENTS

Figure 1:
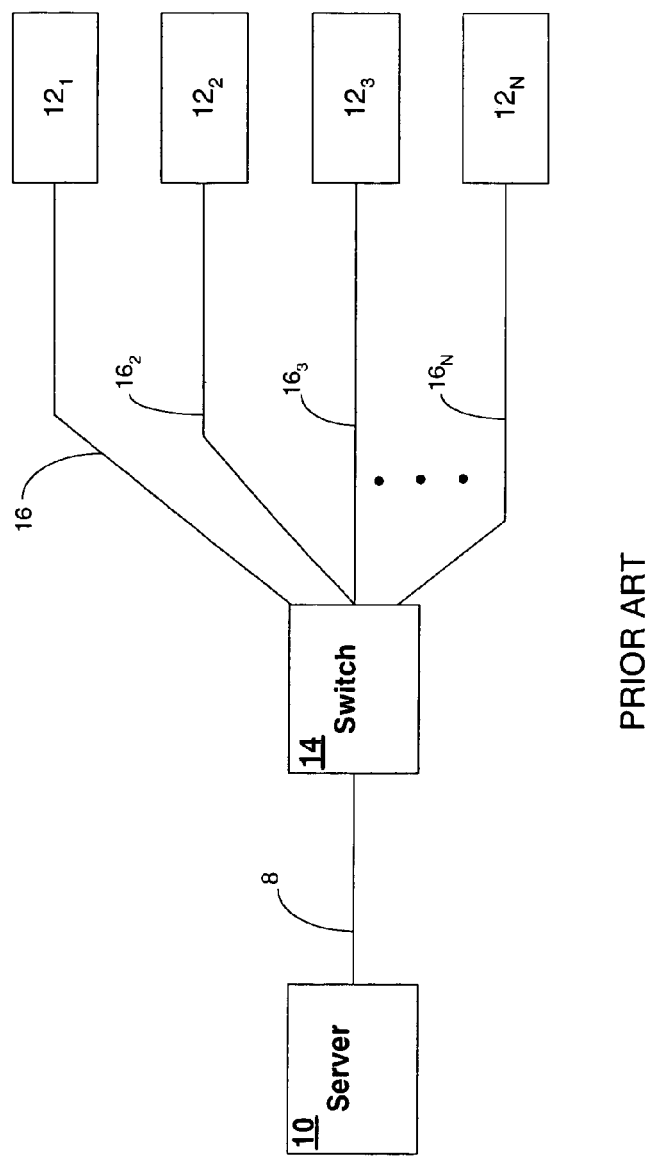
FIG. 1 schematically shows a prior art Server/Client network arrangement that may be used in connection with specific embodiments of the invention.
Figure 2:
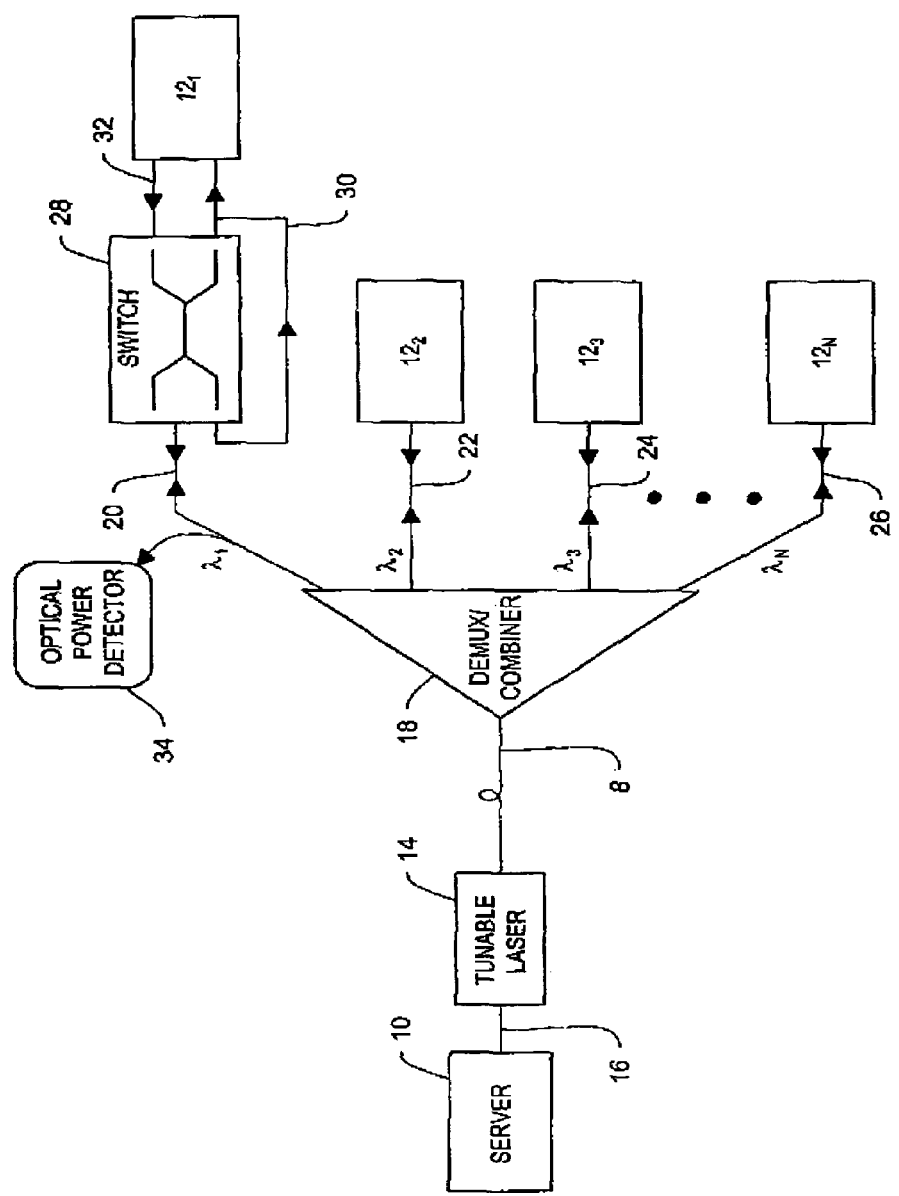
FIG. 2 schematically shows a Server/Client network arrangement incorporating a hybrid WDM/TDM protocol in accordance with preferred embodiments of the invention.

Embodiments of the present invention may advantageously be employed in implementing a network between a first device, referred to herein, without limitation, as a 'Server,' and a plurality of other devices, referred to herein, again without limitation, as 'Clients.' With reference to FIG. 2, the Server is denoted by numeral 10, and the Clients by subscripted numeral 12, thus: $12_1$, $12_2$, $12_3$, ... $12_N$. The Server is assumed to communicate with one and only one Client at any one time and is the network manager device. The direction of information exchange from the Server to any of the Clients is referred to herein as the "downstream" direction, whereas information flow from any Client to the Server is referred to as information flow in the "upstream" direction. Clients, in this architecture, do not intercommunicate with each other.

One method for multiplexing information intended for a multiplicity of recipients is the use of multiple optical carrier frequencies. In accordance with preferred embodiments of the present invention, information intended by Server 10 for downstream transmission used to modulate the output of a tunable laser 14 which is either incorporated within the server or to which the Server has access. The carrier frequency of tunable laser 14 may be tuned to any of a specified grid of frequencies, or, equivalently (for a given propagation medium), wavelengths, herein designated $\lambda_1, \lambda_2, \lambda_3, \ldots \lambda_N$. The frequency grid may, for example, be that of the industry-standard International Telegraph Union (ITU) C-band grid, however a laser tunable, in discrete intervals, over any specified range of wavelengths is within the scope of the present invention.

Data from server 10 intended for a particular Client, 12$_i$, is transmitted over electrical connection to modulate the output of laser 14 at wavelength $\lambda_i$. The optical output of laser 14 is transmitted over optical link 8 to a demultiplexer (demux) 18. Demux 18 is set to the same wavelength grid as laser 14. Demux 18 separates the optical transmission over optical link 8 according to wavelength, with a specified wavelength, or group of wavelengths, directed over each of ports 20, 22, 24, and 26. Each port is connected optically to a distinct Client, 12$_i$, with the correspondence known to Server 10. The particular wavelength $\lambda_i$ assigned to each client 12$_i$ is known, at least, to the Server and the Client concerned. Thus, if Server 10 intends for data to be transmitted to Client, 12$_i$ which receives wavelength $\lambda_i$, server transmits a signal via laser 14 at the specified wavelength which is then steered by demux 18 to the appropriate port and thence to the selected Client. Only the wavelength $\lambda_i$, or a suite of wavelengths, intended for Client 12$_i$ passes through the selected port, and data intended for other Clients will not reach Client 12$_i$. Mutatis mutandis, the other ports will not see the transmission intended uniquely for the selected Client 12$_i$.

As alluded to in the previous discussion, demux 18 may be programmed either to direct each wavelength to a distinct Client, or, alternatively, to allow one or more specified wavelengths to pass to more than one Client, thereby multicasting to multiple, or all, Clients 12 connected to demux 18.

With respect to a selective multicasting function, demux 18 may be programmed to transmit a specified wavelength to a subset of ports 20, 22, 24, and 26.

Data transmission, in the downstream direction, from server 10 to Clients {12$_i$}, as heretofore described, is accomplished via Wavelength Division Multiplexing (WDM). In accordance with preferred embodiments of the invention, upstream transmission of data, from Clients to Server, is accomplished using a Time Division Multiplexing (TDM)— like paradigm. In a 'speak only when spoken to' protocol, optical outputs of all Clients {12$_i$} is combined by demux 18 also serving as a combiner. Since all upstream transmissions are conveyed to Server 10, the wavelength of transmission of each Client is not critical. Instead, the transmitting Client is identified by Server 10 on the basis of its having been addressed by the Server, since, under this protocol, only the Client currently being transmitted to from the server is allowed to transmit. Therefore, low-cost optics may be used by the individual Clients, even though such optics would not be compatible with full WDM operation.

If Client-to-Server communications are to be facilitated, Server 10 will regularly poll each of the Clients {12$_i$} to give each Client the opportunity to transmit data to the Server. If the Server has no useful data to transmit to a particular Client 12$_i$, the server will transmit a Null (or Idle) data stream to that Client on the wavelength carrier $\lambda_i$ assigned to that Client. This transmission will be ignored by the Client, but fulfill the 'speak only when spoken to' requirement for the Client to transmit to the Server.

Under certain existing or intended network architectures, including, particularly, FC and Ethernet systems, the receiver at Client 12 must always see a signal. Referring further to FIG. 2, this requirement may be satisfied as illustrated with respect to the connection of Client 12$_i$ to port 20. The output 32 of Client 12$_i$ is switched back to the receiver of the same Client when Server 10 is not addressing it. This is accomplished by switch 28 which is preferably a 2×2 optical switch, connected between demux/combiner 18 and each Client 12. An optical power detector 34 at the switch detects which power is being transmitted by demux 18 from the Server, in which case port 20 is switched to the Client. Otherwise, the output of the Client is switched back, via path 30, to the Client's own receiver. The Client is programmed to recognize and ignore its own transmission.

It should be noted that, whereas the Fiber Channel standard is discussed by way of example, embodiments of the invention are not limited to that standard. Accordingly, various embodiments can be used on other types of networks that transmit data and even on networks that transmit optical power.

It also should be noted that different numbers and types of network devices 10, 12 than those shown may be used in the network 8. For example, the Server, or central management device, 12 may be a router, multiplexer, or hub, whereas network devices 12$_1$, 12$_2$, 12$_3$, . . . 12$_N$ may be computer peripherals, or network appliances of any sort.

In other embodiments, the disclosed apparatus and method may be controlled by a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. An apparatus for coupling a first network device with a plurality of client network devices, the apparatus comprising:
    an optical link;
    a tunable light source for injecting an optical signal characterized by a carrier wavelength onto the optical link;
    a demultiplexer/combiner for directing the optical signal to at least one specified client network device on the basis of the carrier wavelength of the optical signal and for directing optical signals from the plurality of client network devices to the first network device;

a combiner operable to time division multiplex the optical signals sent from the plurality of client network devices to the first network device; and a switch coupled between the demultiplexer/combiner a client network devices for switching any output of the client network device back to the client network device unless the client network device is being addressed by the first network device.

2. The apparatus as defined by claim 1, wherein the tunable light source is a laser.

3. The apparatus as defined by claim 1, wherein the switch is an optical switch.

4. The apparatus as defined by claim 1, further including an optical power detector for detecting when a specified client network device is being addressed by the first network device.

* * * * *